(12) United States Patent
Teo et al.

(10) Patent No.: US 10,838,688 B2
(45) Date of Patent: Nov. 17, 2020

(54) WEARABLE ELECTRONIC DEVICE AND SYSTEM AND METHOD FOR POSTURE CONTROL

(71) Applicant: Harman International Industries, Incorporated, Stamford, CT (US)

(72) Inventors: Hangmeng Teo, Shanghai (CN); Rongjian Huang, Shenzhen (CN)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 16/552,356

(22) Filed: Aug. 27, 2019

(65) Prior Publication Data

US 2020/0073624 A1   Mar. 5, 2020

(30) Foreign Application Priority Data

Aug. 31, 2018  (CN) .......................... 2018 1 1012130

(51) Int. Cl.

| G06F 3/16 | (2006.01) |
|---|---|
| H04B 1/3827 | (2015.01) |
| H04W 4/80 | (2018.01) |
| G01P 13/00 | (2006.01) |
| H04R 3/00 | (2006.01) |
| H05B 45/20 | (2020.01) |
| H05B 47/19 | (2020.01) |

(52) U.S. Cl.
CPC .............. G06F 3/165 (2013.01); G01P 13/00 (2013.01); H04B 1/385 (2013.01); H04R 3/00 (2013.01); H04W 4/80 (2018.02); H05B 45/20 (2020.01); H05B 47/19 (2020.01); H04R 2420/07 (2013.01)

(58) Field of Classification Search
CPC .......... G06F 3/165; H04W 4/80; H05B 45/20; H05B 47/19; G01P 13/00; H04B 1/385; H04R 3/00; H04R 2420/07
USPC .......................................................... 381/59
See application file for complete search history.

(56) References Cited

U.S. PATENT DOCUMENTS

| 5,855,513 A * | 1/1999 | Lam .................... A63F 3/00643 |
| | | 273/237 |
| 2008/0205681 A1* | 8/2008 | Norberg ............... G11B 27/105 |
| | | 381/334 |
| 2014/0132410 A1* | 5/2014 | Chang ..................... G06F 3/014 |
| | | 340/539.11 |
| 2014/0235339 A1* | 8/2014 | Matsushita .......... A63F 11/0051 |
| | | 463/31 |
| 2016/0179199 A1* | 6/2016 | Levesque ................ G06F 3/011 |
| | | 340/407.2 |
| 2017/0147074 A1 | 5/2017 | Buttolo et al. |
| 2017/0280277 A1* | 9/2017 | Ge .......................... H04W 4/00 |
| 2018/0199021 A1* | 7/2018 | Herschman ............ H04N 5/765 |

(Continued)

FOREIGN PATENT DOCUMENTS

| EP | 2418874 B1 | 10/2012 |
| WO | 2017/201492 A1 | 11/2017 |

*Primary Examiner* — Quynh H Nguyen
(74) *Attorney, Agent, or Firm* — Angela M. Brunetti

(57) ABSTRACT

A wearable electronic device has a motion tracking sensor device for detecting a motion track of the wearable electronic device. A processor converts a motion track signal to a predefined command, which is sent to a loudspeaker by a transceiver via wireless communication, and the loudspeaker receives the predefined command and executes a corresponding operation.

8 Claims, 2 Drawing Sheets

(56) References Cited

U.S. PATENT DOCUMENTS

2018/0307908 A1\* 10/2018 O'Brien ................. G06F 3/011
2019/0129508 A1\* 5/2019 Harrison .............. A61B 5/1123

\* cited by examiner

WEARABLE ELECTRONIC DEVICE AND SYSTEM AND METHOD FOR POSTURE CONTROL

CROSS-REFERENCE

This application claims priority to CN Application No. 201811012130.1, filed Aug. 31, 2018, the disclosure of which is incorporated, in its entirety, by reference herein.

TECHNICAL FIELD

The present disclosure generally relates to wearable electronic devices, and particularly, to a wearable electronic device that can be controlled with postures for use with a loudspeaker. The inventive subject matter further relates to a posture control system using the wearable electronic device and a use method thereof.

BACKGROUND

Loudspeakers currently available on the market for parties can only interact with a user through gestures, and IR technologies are applied in this process of interaction with loudspeakers through gestures. Therefore, the user needs to place a hand 1-2 cm above a control panel. The distance of 1-2 cm above the control panel means that the user's hand almost touches the panel. In addition, the user must be close to the physical loudspeaker. Since the user's body must be close to the user interface panel to make control gestures, the user cannot move freely. As a result, the user's experience at the party is limited. In addition, when the user performs gesture control close to the panel, the user's body can also block the party loudspeaker.

Therefore, there is a need for a system for performing posture control and solving the above problems.

SUMMARY

The inventive subject matter provides a wearable electronic device for posture control, wherein the wearable electronic device comprises a motion tracking sensor device, a processor, and a transceiver. The motion tracking sensor device is configured to be accommodated in the wearable electronic device for detecting a motion track of the wearable electronic device. The processor is configured to be connected to the motion tracking sensor device in the wearable electronic device, and the processor receives a signal from the motion tracking sensor device and converts the received signal to a predefined command. The transceiver is configured to be accommodated in the wearable electronic device for connection with the processor and send the predefined command via wireless communication.

Alternatively, the motion tracking sensor device of the wearable electronic device further comprises at least one of a gyroscope, a vibration sensor, and an accelerator sensor.

Alternatively, the motion track detected by the motion tracking sensor device of the wearable electronic device comprises any one or more of the following motions: a motion in the vertical direction, a motion in the horizontal direction, a motion in an arc or curved direction, and an impact-type motion.

Alternatively, the processor of the wearable electronic device is an encoder.

Alternatively, the wearable electronic device further comprises one or more LEDs, and the processor causes the LEDs to flicker according to a received operation command.

Alternatively, the wearable electronic device is in the form of a wristband or collar.

Alternatively, the wearable electronic device itself may be in a detachable form, so as to be detachably mounted onto a binding device to be worn on a given location of the user's body, and the binding device may be in the form of a wristband or collar.

In another aspect, the inventive subject matter further provides a posture control system, which comprises a plurality of wearable electronic devices provided by the inventive subject matter and a loudspeaker. The loudspeaker is configured to comprise a processor, a button assembly, and a transceiver. The processor in the loudspeaker is configured to execute a corresponding operation in the loudspeaker according to a received predefined command. The button assembly in the loudspeaker is configured to be connected to the processor, on the shell of the loudspeaker, and comprise at least one button. A user may operate the button assembly to achieve corresponding functions, such as performing mode switching, broadcasting a message or a command, and the like. The transceiver of the loudspeaker is configured to connect with the processor, in the loudspeaker, for receiving predefined commands sent by the wearable electronic devices via wireless communication, and is configured to send operation commands processed by the processor to the wearable electronic devices via wireless communication.

Alternatively, the wearable electronic devices and the transceiver of the loudspeaker may both send commands via wireless communication, and the wireless communication may comprise, for example, Bluetooth, radio frequency (RF), and wireless local area network (WiFi).

Alternatively, the corresponding operation that may be executed by the wearable electronic device after sending the predefined command to the loudspeaker comprises, for example, executing a lighting effect, executing an audio effect, and switching communication modes.

Alternatively, the communication modes of the posture control system according to the inventive subject matter comprise the following three modes: communications by one wearable electronic device to the loudspeaker, communications between one wearable electronic device and other wearable electronic devices, and communications between a plurality of wearable electronic devices and the loudspeaker.

Alternatively, the mode switching implemented by the button assembly of the loudspeaker comprises starting or ending a game mode, or may further comprise activating broadcasting of a command to all wearable electronic devices via wireless communication.

In yet another aspect, the inventive subject matter further provides a method for controlling a loudspeaker through postures, wherein the method comprises: detecting a motion track of a wearable electronic device; converting the detected motion track of the wearable electronic device to a corresponding predefined command; and sending the predefined command to a loudspeaker via wireless communication for executing a corresponding operation.

Alternatively, the loudspeaker has a multi-link mode, and in the multi-link mode, the loudspeaker automatically scans and links to a plurality of wearable electronic devices in the surroundings.

Alternatively, a wearable electronic device among the plurality of wearable electronic devices that may perform posture control on the loudspeaker is made to be a primary control wearable electronic device.

Alternatively, one or more LEDs of a wearable electronic device may be controlled by the processor of the wearable electronic device, and according to an operation command sent by the loudspeaker and received by the wearable electronic device, the LEDs of the wearable electronic device may be made to flicker in various colors or patterns of light.

Alternatively, when executing the posture control method according to the inventive subject matter, in the mode of communications by the primary control wearable electronic device to the loudspeaker, the primary control wearable electronic device detects its own motion track, converts the motion track to a corresponding command, and sends the command to the loudspeaker via wireless communication for executing a corresponding operation, such as executing a lighting effect, executing an audio effect, or switching communication modes.

Alternatively, when executing the posture control method according to the inventive subject matter, in the mode of communications between the primary control wearable electronic device and other wearable electronic devices, the primary control wearable electronic device detects its own motion track, and sends a corresponding command to the loudspeaker, so that the primary control over the loudspeaker is randomly transferred to another wearable electronic device.

Alternatively, any one of the wearable electronic devices detects its motion track, and through a corresponding command forwarded by the loudspeaker, indicates a particular mood to the primary control wearable electronic device, for example, causing the primary control wearable electronic device to flicker in one color to indicate "like" or in another color to indicate "dislike."

Alternatively, when executing the posture control method according to the inventive subject matter, in the mode of communications between the plurality of wearable electronic devices and the loudspeaker, these wearable electronic devices simultaneously detect the same motion track and send a corresponding command to the loudspeaker for executing a corresponding operation, for example, controlling the plurality of wearable electronic devices by broadcasting a command via wireless communication, such that they flicker in various colors or patterns of light.

With the above-described wearable electronic device, posture control system, and method for control through postures according to the inventive subject matter, communications and corresponding operations are performed between a user wearing the wearable electronic device and the loudspeaker, thereby achieving control on scenarios using body movement postures without needing to limit the user's freedom of movement. In addition, the interaction with the loudspeaker is enhanced, thereby resulting in a thrilling sense of immersion and improving the experience of control through postures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

While various aspects of the present disclosure are described with reference to a particular illustrative embodiment, the present disclosure is not limited to such embodiments, and additional modifications, applications, and embodiments may be implemented without departing from the present disclosure. In the figures, like reference numbers will be used to illustrate the same components. Those skilled in the art will recognize that the various components set forth herein may be altered without varying from the scope of the present disclosure.

Any one or more of the servers, receivers, or devices described herein include computer executable instructions that may be compiled or interpreted from computer programs created using a variety of programming languages and/or technologies. In general, a processor (such as a microprocessor) receives instructions, for example from a memory, a computer-readable medium, or the like, and executes the instructions. A processing unit includes a non-transitory computer-readable storage medium capable of executing instructions of a software program. The computer readable storage medium may be, but is not limited to, an electronic storage device, a magnetic storage device, an optical storage device, an electromagnetic storage device, a semi-conductor storage device, or any suitable combination thereof. Any one or more the devices herein may rely on firmware, which may require updates from time to time to ensure compatibility with operating systems, improvements and additional functionality, security updates or the like. Connecting and networking servers, receivers or devices may include, but are not limited to, SATA, Wi-Fi, lightning, Ethernet, UFS, 5G, etc. One or more servers, receivers, or devices may operate using a dedicated operating system, multiple software programs and/or platforms for interfaces such as graphics, audio, wireless networking, enabling applications, integrating hardware of vehicle components, systems, and external devices such as smart phones, tablets, and other systems to name just a few.

Figure 1:
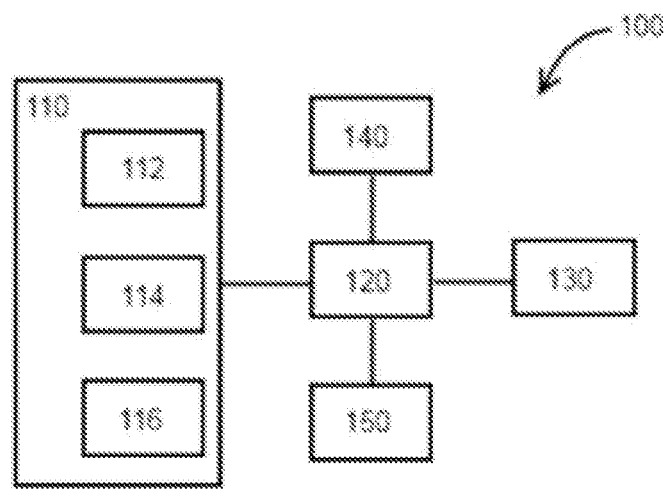
FIG. 1 is a schematic structure diagram of a wearable electronic device according to one or more embodiments of the inventive subject matter.

As shown in FIG. 1, a wearable electronic device 100 according to the inventive subject matter can be applied to a loudspeaker 200 (not shown in FIG. 1). The wearable electronic device 100 is provided with a motion tracking sensor device 110, a processor 120, and a transceiver 130. The wearable electronic device 100 further comprises an LED 140 and a battery 150.

The wearable electronic device 100 may be, for example, a wristband or collar bound to a part of a user's body. Alternatively, in one or more embodiments, the wearable electronic device 100 may have a separate detachable body to facilitate battery replacement, battery 150 charging, or repair and maintenance. The wearable electronic device 100 may be detachably mounted to a separate binding device. The binding device may be, for example, in the form of a wristband or collar. In one or more embodiments, the wearable electronic device 100 may be connected to an optical fiber to form a necklace. The optical fiber may flicker in various colors or patterns of light. The wearable electronic device 100 featuring various forms enables a wearer to wear the wearable electronic device 100 in various manners.

In one or more embodiments, for example, in a party environment, a DJ and other participants wearing the wearable electronic device 100 according to the inventive subject matter usually move the body freely while enjoying music.

Then, the motion tracking sensor device 110 in the wearable electronic device 100 may detect the moving postures of the body of the DJ and participants using a gyroscope 112, a vibration sensor 114, and/or an accelerator sensor 116 provided therein and express these moving postures as the motion track of the wearable electronic device 100. The detection of a motion track may be executed by, for example, an MPU6050 integrated chip having a three-axis gyroscope and a three-axis accelerator sensor, so that the particular motion track of the wearable electronic device 100 may be detected as the DJ and participants take particular postures by moving their bodies while freely enjoying the music, such as motions in the vertical direction, motions in the horizontal direction, motions in an arc or curved direction (e.g., drawing circles), and impact-type motions (e.g., clapping hands, pounding the table, hitting each other, etc.) that may be made by the DJ and participants as they wave their arms or move their bodies.

The processor 120 of the wearable electronic device 100 can convert these particular motion tracks detected by the motion tracking sensor device 110 to corresponding predefined commands. In one or more embodiments, for example, vertical motion tracks of an arm wearing a wristband-style wearable electronic device 100 swinging downwards and upwards may correspond to predefined commands of turning off and turning on all lights, respectively; horizontal motion tracks of an arm moving to the left and to the right may correspond to predefined commands of turning off and turning on light flickering, respectively; an arm drawing circles clockwise and counterclockwise may correspond to lighting effects embedded on the edges of some loudspeakers 200, such as flickering in a given color or pattern; and clapping hands while waving the arms horizontally indicates switching the posture control communication mode. In other embodiments, a particular posture can even control audio effects, and the user interface of the party loudspeaker 200 may further study postures, e.g., by adding an operation list, but this should be limited to a few simple postures, making them easy for a user to remember and use and thereby maximizing their fun.

Figure 2:
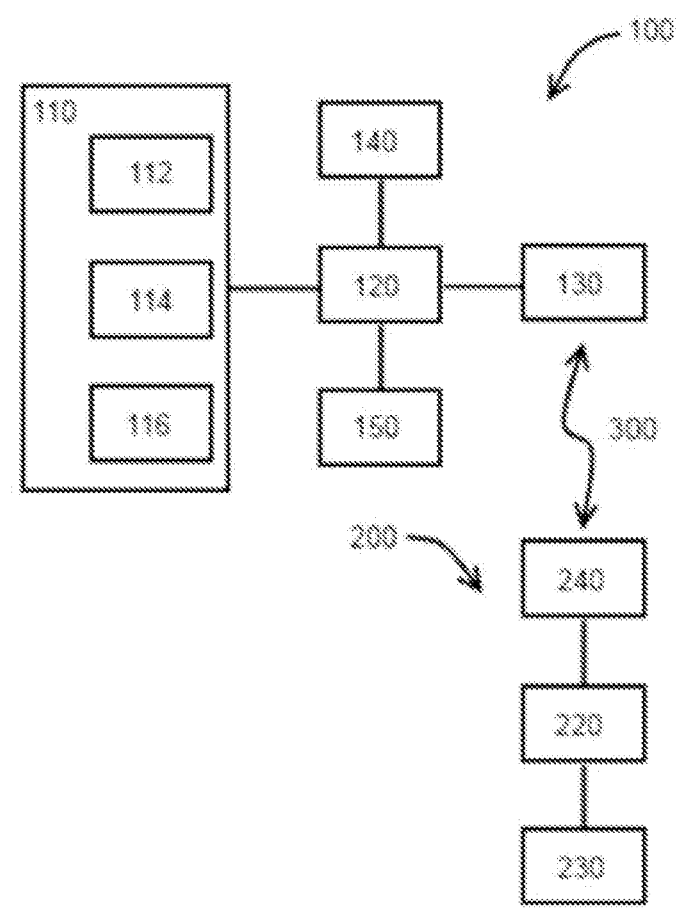
FIG. 2 is a diagram of a posture control system according to one or more embodiments of the inventive subject matter.

As shown in FIG. 2, a posture control system according to the inventive subject matter comprises a wearable electronic device 100 and a loudspeaker 200. The loudspeaker 200 comprises a processor 220, a button assembly 230, and a transceiver 240.

In a party environment, the loudspeaker 200 may automatically scan and link to a plurality of wearable electronic devices 100 in the surroundings. For example, the effective communication radius is about 10 m when Bluetooth Low Energy (BLE) is used, and in the multi-link mode, the loudspeaker 200 may be simultaneously connected to 20 people within a 10 m radius range, who act as participants in posture control. The loudspeaker 200 may send an operation command to the wearable electronic device 100, such that the LED 140 on the wearable electronic device 100 is turned on and/or emits light of various colors or patterns. The loudspeaker 200 is typically operated by one DJ, and the wearable electronic device 100 worn by the DJ can control the lighting and audio effects of the loudspeaker 200, i.e., performing primary control. The party loudspeaker 200 can simultaneously link to a plurality of wearable electronic devices 100, wherein one wearable electronic device 100 may be initially registered as a DJ wearable electronic device 100 by means of a particular ID, for example. This DJ wearable electronic device 100 is worn by the party DJ, while party participants may wear their own wearable electronic devices 100.

In one or more embodiments, the party environment may be in a game mode. The game mode may be activated by a DJ, for example, by pressing a particular button in the button assembly 230 on the loudspeaker 200. In the game mode, the party loudspeaker 200 randomly lights up a wearable electronic device 100, and the participant who wears this wearable electronic device 100 must act according to agreed game rules. When the participant makes a particular posture, the wearable electronic device 100 worn by another participant may randomly light up. This game mode may be continued until the DJ, for example, presses a particular button in the button assembly 230 on the loudspeaker 200 to end the game mode.

The posture control system according to the inventive subject matter achieves communications among the DJ and participants wearing the wearable electronic devices 100 and the loudspeaker 200 at a party. The use scenarios among the DJ, participants, and loudspeaker 200 may be expanded to include the following three communication modes: communications by the primary control wearable electronic device 100 to the loudspeaker 200, communications between the primary control wearable electronic device 100 and a plurality of other wearable electronic devices 100, and communications between the plurality of wearable electronic devices 100 and the loudspeaker 200.

Communication Mode I: Communications by the DJ to the Loudspeaker 200

In this communication mode, the DJ may perform the primary control over the loudspeaker 200. In one or more embodiments, a DJ wearing a wearable electronic device 100 comprising a motion tracking sensor device 110 moves their body to make some particular postures, and the wearable electronic device 100 detects its own motion track through the motion tracking sensor device 110 therein and then generates a predefined command. The predefined command is sent by the transceiver 130 to the loudspeaker 200 via wireless communication 300 (e.g., BLE). The loudspeaker 200 decodes the received command and correspondingly executes the received command, such as executing a particular lighting or audio effect.

Communication Mode II: Communications Between the DJ and a Plurality of Other Participants In the communication mode II, the party may be in game mode. In one or more embodiments, the DJ may perform posture control over participants. For example, the DJ presses a particular button in the button assembly 230 on the loudspeaker 200 to start game mode. By taking a particular posture, i.e., the DJ's wearable electronic device 100 detects a particular motion track, such as clapping hands while waving the hands horizontally when a wristband is worn, the DJ may transfer the primary control over the loudspeaker 200 randomly to a participant. The wearable electronic device 100 worn by the participant who receives the primary control flickers, indicating that the participant has obtained the primary control over the loudspeaker 200 and can control the loudspeaker to execute operations such as lighting effects and speaker effects. This participant needs to execute particular operations and randomly transfers the primary control over the loudspeaker 200 randomly to another participant by making the same particular posture, such as clapping hands while waving the hands horizontally when a wristband is worn.

In communication mode II, in one or more embodiments, participants may perform posture control over the DJ. Any one of the participants may make a particular moving posture, such that the wearable electronic device 100 worn by the DJ flickers in a color or pattern to indicate a feeling, for example, flickering in one color to indicate "like" or in another color to indicate "dislike."

Communication Mode III: Communications Between a Plurality of Participants (Including the DJ) and the Loudspeaker 200

In communication mode III, in one or more embodiments, a plurality of participants performs posture control over the loudspeaker 200. When the participants (including the DJ) make the same moving posture at the same time, the loudspeaker 200 receives a predefined command and executes a corresponding particular operation, such as executing a particular lighting or audio effect.

In one or more embodiments, when the loudspeaker 200 performs posture control over the plurality of participants, the loudspeaker 200 may control (e.g., light up) all the wearable electronic devices 100 by broadcasting a command via wireless communication 300.

Figure 3:
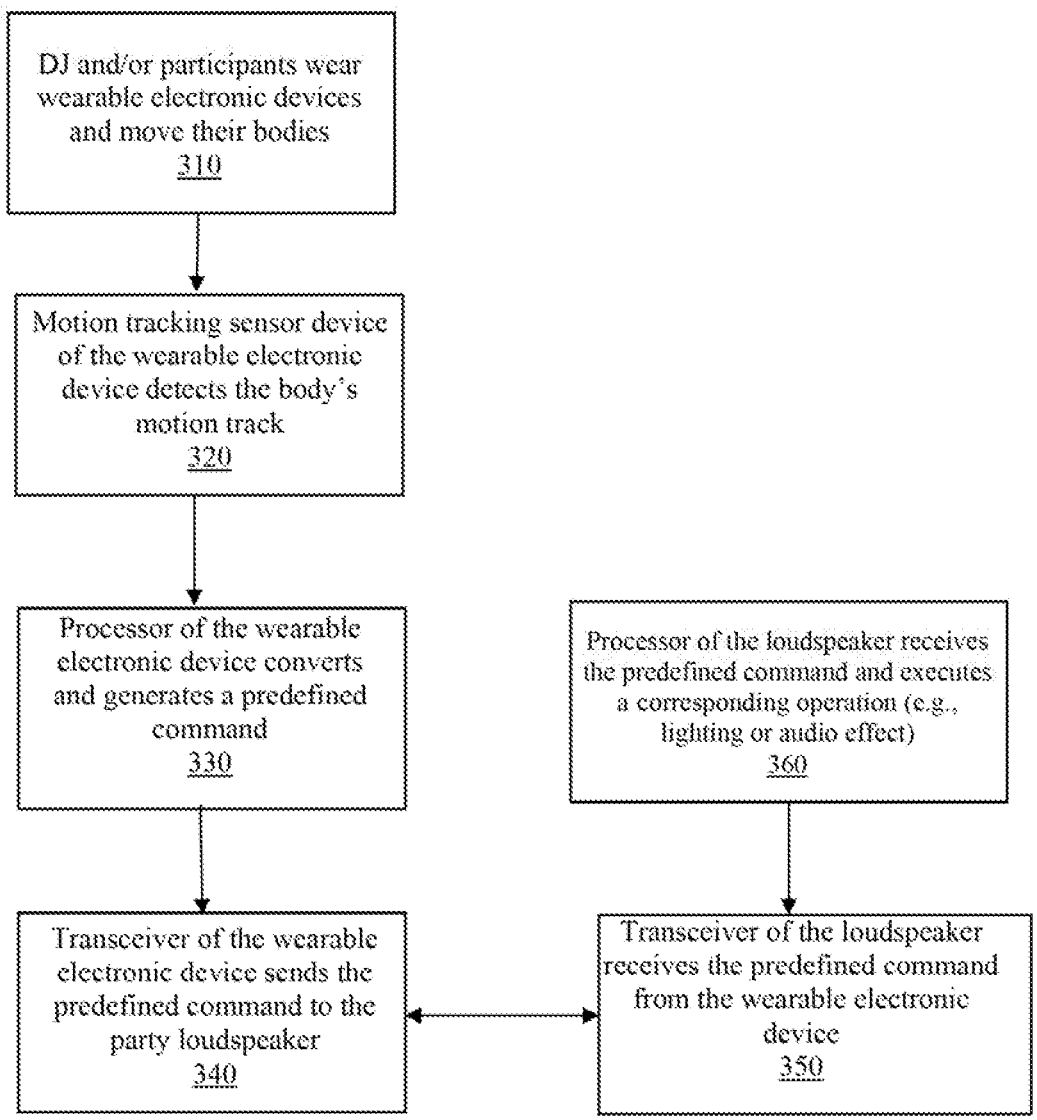
FIG. 3 is a flow chart of a method for control through postures according to one or more embodiments of the inventive subject matter.

FIG. 3 is a flow chart of a method for control through postures according to one or more embodiments of the inventive subject matter. In step 310 the participants (including the DJ) wear the wearable electronic devices and move their bodies. In step 320, a motion tracking sensor device of the wearable electronic device detects the body's motion track. In step 330, a processor of the wearable electronic device converts and generates a predefined command. In step 340, a transceiver of the wearable electronic device sends the predefined command to the party loudspeaker. In step 350, the transceiver of the loudspeaker receives the predefined command from the wearable electronic device. In step 360, the processor of the loudspeaker receives the predefined command and executes a corresponding operation, such as lighting or audio effects.

In the foregoing specification, the present disclosure has been described with reference to specific exemplary embodiments. Various modifications and changes may be made, however, without departing from the scope of the present disclosure as set forth in the claims. The specification and figures are illustrative, rather than restrictive, and modifications are intended to be included within the scope of the present disclosure. Accordingly, the scope of the present disclosure should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present disclosure, in addition to those not specifically recited, may be varied or otherwise particularly adapted to specific environments, manufacturing specifications, design parameters or other operating requirements without departing from the general principles of the same.

The invention claimed is:

1. A method for controlling a loudspeaker through postures, wherein the method comprises:
   detecting a motion track of a wearable electronic device;
   converting the detected motion track of the wearable electronic device to a corresponding predefined command;
   sending the predefined command to a loudspeaker via wireless communication for executing a corresponding operation;
   the loudspeaker is further configured to link a DJ wearable electronic device having primary control over the loudspeaker to execute switching communication modes;
   wherein the communication modes include communications by the DJ-wearable electronic device to the loudspeaker, communications between the DJ-wearable electronic device and a plurality of other wearable electronic devices, and communications between the plurality of wearable electronic devices including the DJ-wearable electronic device and the loudspeaker; and
   wherein, in the mode of communications between the DJ-wearable electronic device and a plurality of other wearable electronic devices, the DJ-wearable electronic device detects its motion track, and when a particular motion track is detected, sends a corresponding predefined command to the loudspeaker, so that the primary control over the loudspeaker is randomly transferred to one of the plurality of other wearable electronic device.

2. The method according to claim 1, wherein the primary control over the loudspeaker further comprises executing a lighting effect and executing an audio effect.

3. The method according to claim 1, wherein the loudspeaker further has a multi-link mode, and in the multi-link mode, the loudspeaker automatically scans and links to a plurality of wearable electronic devices in the surroundings.

4. The method according to claim 1, wherein the wireless communication comprises at least one of Bluetooth, RF, and wireless local area network.

5. The method according to claim 1, wherein the wearable electronic device further comprises one or more LEDs, and the loudspeaker sends a command to cause the LEDs of the wearable electronic device to flicker in various colors or patterns of light.

6. The method according to claim 1, wherein any one of the plurality of other wearable electronic devices detects its motion track, and through a corresponding command forwarded by the loudspeaker, causes the DJ-wearable electronic device to flicker in one color to indicate "like" or in another color to indicate "dislike".

7. A method for controlling a loudspeaker through postures, wherein the method comprises:
   detecting a motion track of a wearable electronic device;
   converting the detected motion track of the wearable electronic device to a corresponding predefined command;
   sending the predefined command to a loudspeaker via wireless communication for executing a corresponding operation;

the loudspeaker is further configured to link a DJ wearable electronic device having primary control over the loudspeaker to execute switching communication modes;

wherein the communication modes include communications by the DJ-wearable electronic device to the loudspeaker, communications between the DJ-wearable electronic device and a plurality of other wearable electronic devices, and communications between the plurality of wearable electronic devices including the DJ-wearable electronic device and the loudspeaker; and wherein, in the mode of communications between the plurality of wearable electronic devices including the DJ-wearable electronic device and the loudspeaker, when simultaneously detecting the same motion track, the plurality of wearable electronic devices including the DJ-wearable electronic device send a corresponding predefined command to the loudspeaker for executing the corresponding operation.

8. The method according to claim 7, wherein the corresponding operation further comprises controlling the plurality of wearable electronic devices by broadcasting a command via wireless communication.

* * * * *